No. 814,916. PATENTED MAR. 13, 1906.
J. R. McKEE.
COTTON CHOPPER.
APPLICATION FILED OCT. 21, 1905.
3 SHEETS—SHEET 1.
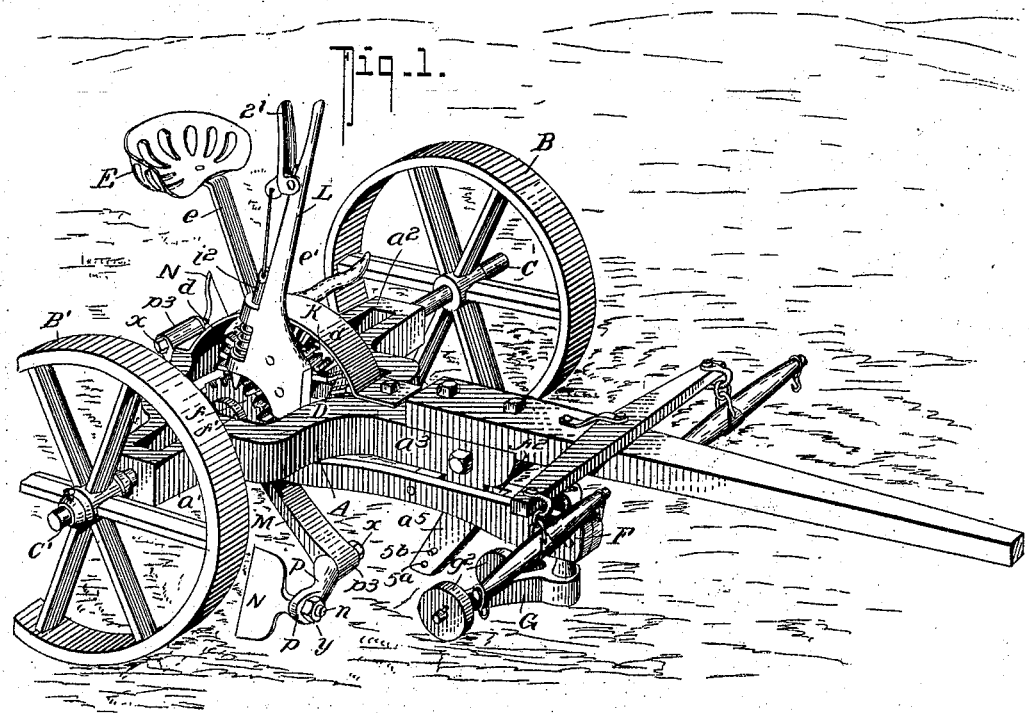
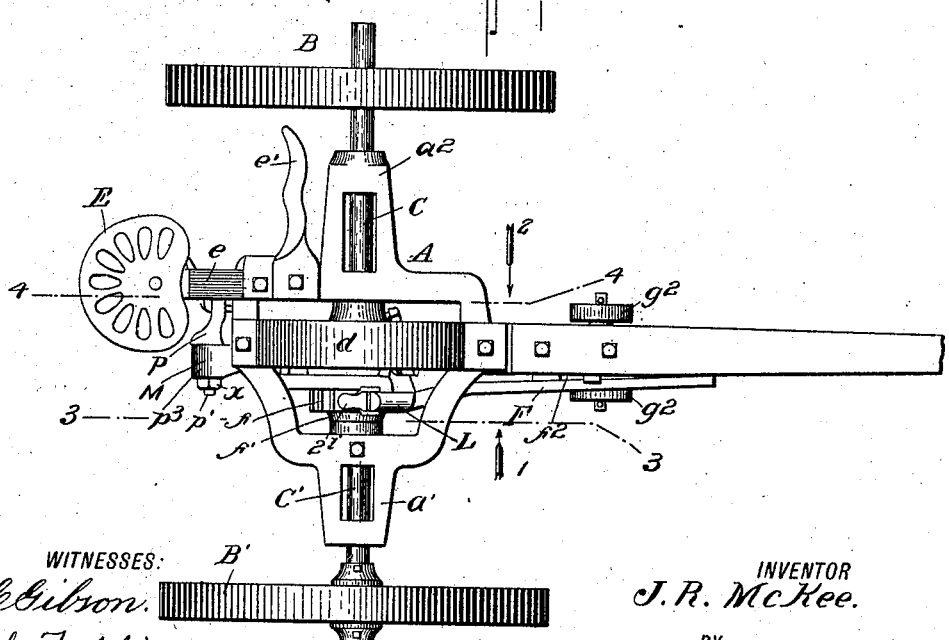
WITNESSES:
F. C. Gibson.
John T. Schrott.
INVENTOR
J. R. McKee.
BY
Fred G. Dieterich & Co
ATTORNEYS No. 814,916. PATENTED MAR. 13, 1906.
J. R. McKEE.
COTTON CHOPPER.
APPLICATION FILED OCT. 21, 1905.
3 SHEETS—SHEET 2.
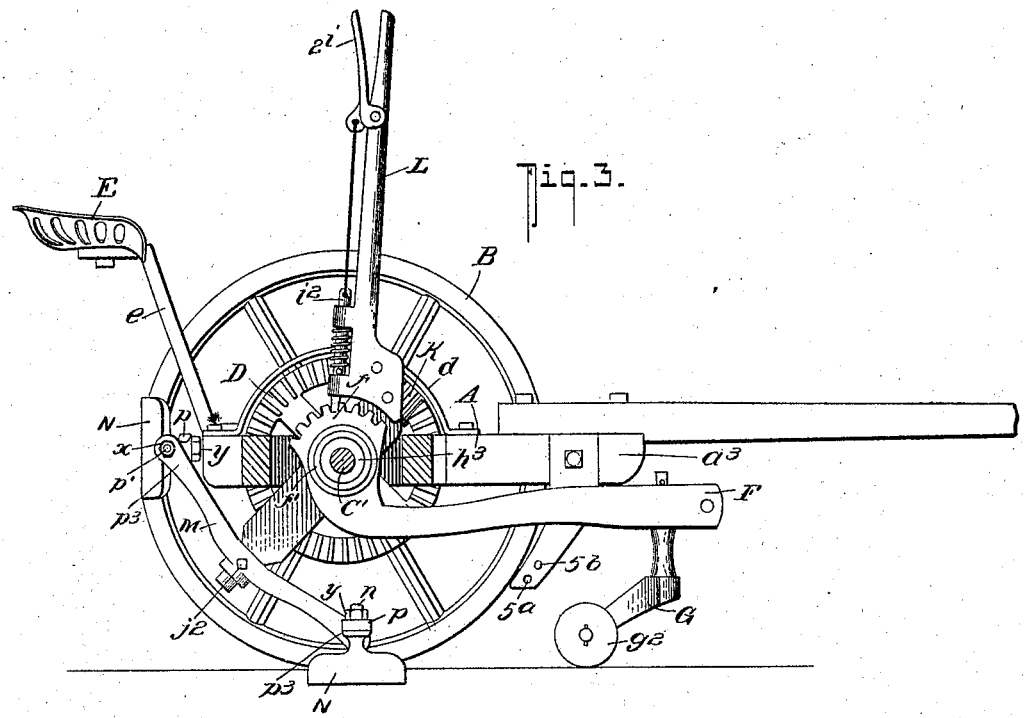
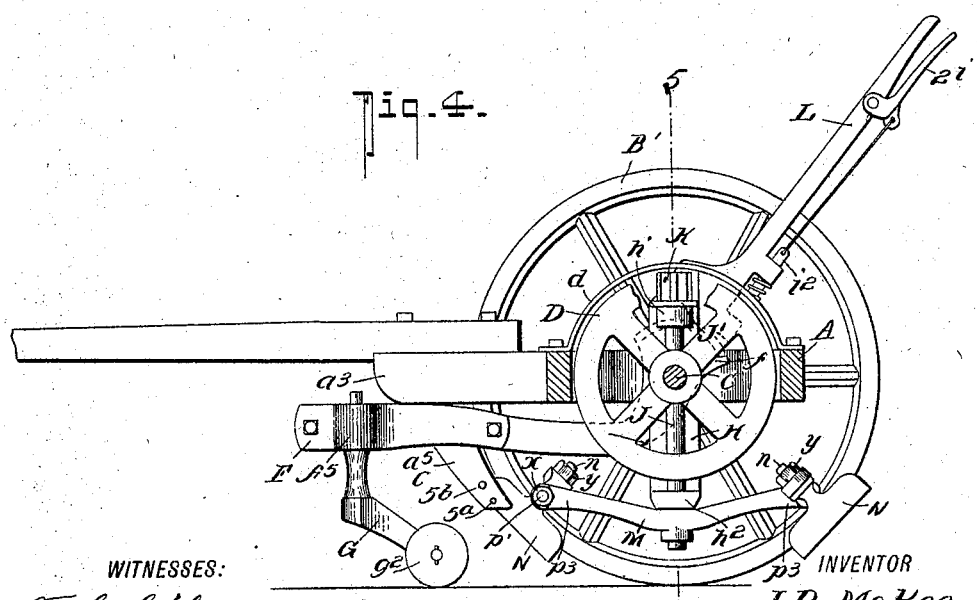
WITNESSES:
F. C. Gibson
John T. Schrott.
INVENTOR
J. R. McKee.
BY
Fred G. Dieterich & Co.
ATTORNEYS No. 814,916. PATENTED MAR. 13, 1906.
J. R. McKEE.
COTTON CHOPPER.
APPLICATION FILED OCT. 21, 1905.
3 SHEETS—SHEET 3.
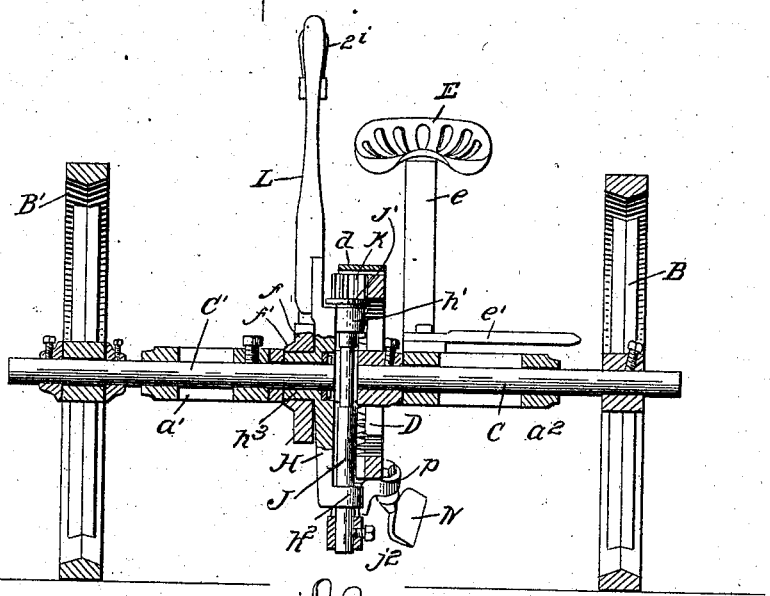
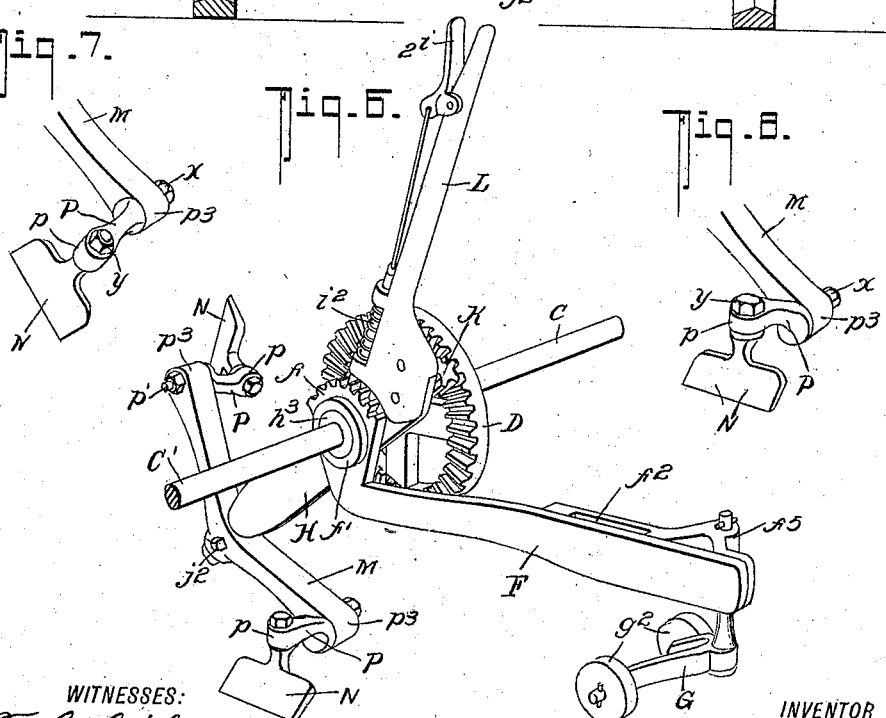
WITNESSES:
F. C. Gibson.
John T. Schrott.
INVENTOR
J. R. McKee.
BY
Fred G. Dieterich
ATTORNEYS

UNITED STATES PATENT OFFICE.

JACOB RUFUS McKEE, OF MOUNT CALM, TEXAS.

COTTON-CHOPPER.

No. 814,916.     Specification of Letters Patent.     Patented March 13, 1906.

Application filed October 21, 1905. Serial No. 283,793.

*To all whom it may concern:*

Be it known that I, JACOB RUFUS McKEE, residing at Mount Calm, in the county of Hill and State of Texas, have invented a new and Improved Cotton-Chopper, of which the following is a specification.

This invention comprehends certain new and useful improvements in cotton-choppers, and primarily seeks to provide a mechanism of the character stated of a simple and economical construction which can be readily manipulated and which effectively serves for chopping or cutting corn, cane, broom-corn, peas, or any similar plants that are planted thick in drills or rows.

My invention embodies an improved arrangement and adjustment of the chopping-blades whereby they can be set to cut at an angle in a plane parallel with the ground or at different angles with respect thereto, and to cut a wide or small swath, as desired, lever mechanism operable from the driver's seat being also provided for holding the wheel-frame and its chopping-blades down to the ground.

In its more specific nature my invention consists in certain details of construction and novel combination of parts, particularly the means for adjusting the cutter-blades or choppers, whereby to scrape flat with the earth to cut a wide space on each side of the row in order to cut the weeds and grass on each side of the drill as well as in the drill, all of which will be hereinafter fully explained, pointed out in the appended claims, and illustrated in the accompanying drawings, in which—

Figure 1 is a perspective view of my invention, showing the same set up as in use. Fig. 2 is a plan view thereof. Fig. 3 is a vertical longitudinal section of the same on the line 3 3 on Fig. 2 looking in the direction of the arrow 1, the parts being in the position indicated in Fig. 1. Fig. 4 is a similar view on the line 4 4 on Fig. 2 looking in the direction of the arrow 2, the wheel-frame being adjusted to bring the cutters above the earth to permit of easy travel of the machine over the field when not in use. Fig. 5 is a cross-section taken on the line 5 5 of Fig. 4. Fig. 6 is a perspective view of the wheel with its cutters or scrapers and the supports or carriage in which the wheel is mounted and which in turn is rockably mounted on one of the wheel-axles. Figs. 7 and 8 are detail views illustrating the connection of and the adjustability of one of the scraper or cutter blades.

In the practical construction of my invention the carriage or supporting-frame A is in the nature of a skeleton cross-frame and is composed of the central or yoke portion, the extensions $a'$ $a^2$ at the opposite sides, and the forwardly-extending tongue or pole portion $a^3$, in practice preferably cast integral with the other parts of the frame A, but may be, if desired, a separate member bolted or otherwise secured to the frame A. The outer end of the pole carries the usual arrangement of swingle and double trees, as shown.

The supporting-axle in my construction of machine is made of two sections disposed in the same longitudinal plane, and one of said sections C is mounted in the side extension $a^2$ of the frame A and has the wheel B fixedly connected thereto, so as to turn with the wheel B, which hereinafter is termed the "drive-wheel." On its inner end the shaft C has fixedly connected therewith the large drive-gear D, which turns within the yoke portion of the frame under a housing or guard-plate $d$. The shaft-section C' is journaled in the opposite frame extension $a'$ and on the outer end thereof the wheel B is loosely mounted.

E designates the driver's seat on the standard $e$, secured at the lower end to the frame A and having the usual foot-rest $e'$.

F designates a supplemental beam or member that extends forwardly in a plane with the pole or tongue and which has at its rear end a ratchet-disk $f$ and hub $f'$, whereby it is loosely supported on the stationary axle member C', as clearly shown in Fig. 5. At the front end the beam F has a longitudinal slot $f^2$ to receive a guide $a^5$, pendently secured to the tongue $a^3$, which has a series of apertures $5^a$ to receive a stop-pin $5^b$, which limits the drop of the beam F, the front end of which is supported on a caster-wheel frame G, which includes a vertical shank journaled in a bearing $f^5$ on the front end of the said beam. By supporting the beam F and loosely connecting it in the manner shown and described the small caster-wheels $g^2$ $g^2$ as they travel in front of the hoes or chopping-blades (presently referred to) over irregular ground move up or down, and thereby adjust the beam F and the mechanism sustained thereby to suit the undulations or irregularities of the rows or drills.

H designates a carrier-frame loosely mounted on the inner end of the stationary axle C' adjacent the ratchet-disk $f$, and the said frame H includes the inwardly-projecting upper and lower apertured ears $h'$ $h^2$, that form the bearing for the wheel-frame shaft presently referred to. The upper part of the frame H has an integral or otherwise fixedly-secured lever L, and to hold the lever to its locked position with respect to the beam F a spring-pawl $i^2$ is secured to the lower end of the lever L, controlled by the handle-piece $2^i$ and adapted to interlock with the ratchet-wheel whereby to make the two frames H and F to move as one.

J designates the shaft of the whirling cutter device journaled in the apertured ears $h'$ $h^2$, which carries a small pinion K, in practice of one-sixth the diameter of the drive-gear D, so as to obtain a six-to-one relative rotation between the large and small gears, and the said shaft J is held at the upper end by a collar J' and at the bottom of the frame by the take-up screw $j^2$, the adjustment of the latter permitting the setting of the shaft J to bring the hoe-carrying frame over the ground to give the blades the desired vertical adjustment with respect to the ground-surface over which they pass. The pinion on the shaft meshes with the large pinion from which it and the wheel-frame receive motion.

The whirling frame comprises a bar or member M, transversely secured on the lower end of the whirling shaft, to which it is made fast by the screw $J^2$, and the said bar is of an obtuse-angled shape in side elevation, so that when the forward end is driven to bring the cutter at that end in position to act the other blade or cutter will be elevated (see Fig. 3) to such extent to freely pass over the plants.

It will be noticed by reference to Fig. 3 that when the lever L is tilted forward such movement of the lever through the pawl-and-ratchet-wheel connections causes frame H to rock and bring the shaft J down at an incline, and thus leave the shaft with the pinion so positioned that the forward arm of the obtuse angle shaped lever member M as it moves across the row is practically in a plane with that of the earth, while the rear arm is sufficiently elevated to pass over the row. Now to provide for cutting into the row or drill at different angles thereto each of the cutters or hoes is adjustably secured to the corresponding end of the member M, and for such purpose each of the blades or hoes N is secured by having the shank $n$, that projects vertically at an obtuse angle from the face of the hoes, mounted in a bearing $p$ in the outer end of a bracket P, having a shank $p'$, that projects at right angles to the shank $n$ of the blade or hoe. Each shank $p'$ is rockably mounted in a bearing $p^3$, formed in the outer ends of the member M and in such manner that the bracket member P can be turned to any angle desired with respect to the hoe, and the latter can have its cutting or scraping edge adjusted so that as it whirls about it will take a little or large surface, as the case may be, the adjustment of the blade and the bracket-bearings P being fixed by the nuts X and Y, that engage with the frame M and bracket P.

From the foregoing description, taken in connection with the accompanying drawings, its complete construction and the general manner in which my invention operates, it is believed, will be readily understood. It will be also noticed that by reason of the peculiar construction and arrangement of parts the caster frame or rollers take up the irregularities of the ground, and thus hold the whirling frame in proper position for operation, and owing to the adjustment of the cutters or blades they can be set to cut a wide swath or space on each side of the row, so as to cut the weeds and grass on each side of the drill as well as in the drill or hill. Further, since the blades or hoes can be readily adjusted as described they can be set to cut a wide space in order to go into a crooked drill or row of cotton as well as a straight drill, since the blades take in a swath wide enough so as to not miss cutting to a stand, and again by simply adjusting the clamp-screws the hoes can be set at any angle to cut deep or shallow. The front hoe always does the cutting as the other hoe passes over the plants.

My improved construction of machine will work in all kinds of cotton rows, in water, furrows, flat or ridges, and in all ways that are required to effect the desired results. To set the hoes to work, the operator need only shift the lever to the forward position shown in Figs. 1 and 2.

Having thus described my invention, what I claim, and desire to secure by Letters Patent, is—

1. In a machine of the character stated, a whirling frame which comprises a rotatably and vertically adjustably mounted shaft, an obtuse-angled member secured to the lower end thereof, a hoe adjustably mounted in each end of the angled member and a means for imparting rotary motion to the shaft, and a means for setting the shaft at vertical angles with respect to the line of draft of the machine.

2. In a wheeled cotton-chopper, a whirling frame, supported on the wheel-axles, a lever-set means for adjusting said frame to different vertical angles with respect to the line of draft of the machine, a shaft mounted to rotate on the said frame, a cross member secured to the lower end of said shaft, a cutter-hoe adjustably mounted on each of the cross member and gear devices actuated from one of the wheels, and connected with the rotary shaft, for the purposes described.

3. In a cotton-chopper, of the character described, comprising the wheels, two axle members, one of which is fixedly connected, the other having its wheel loosely mounted thereon, a frame rockably mounted on the axle members, a drive-gear on the inner end of the axle that turns with its wheel, a swinging frame loosely mounted on the other axle, a whirling frame comprising a shaft journaled in the swinging frame, a pinion on the upper end of the said shaft that engages the drive-gear, a cross member adjustably mounted on the lower ends of the said shaft, a cutting-hoe adjustably mounted on each end of said cross member, a beam-frame loosely hung at its rear end on the axle, a caster-wheel frame on the front end of said beam, a lever pawl and ratchet devices that join the loosely-held beam and the swinging frame, all being arranged substantially as shown and for the purposes specified.

4. The combination with the vertically-adjustable rotary shaft and the means for rotating the same; of an obtuse-angle-shaped cross member secured to the lower end of the shaft, a chopping hoe or blade for each end of the obtuse-angled member, and means for adjustably connecting the said hoes whereby to set them at different angles, for the purposes specified.

5. The combination with the main frame, a supplemental beam loosely mounted at its rear end on the frame to swing in a vertical plane, and the caster-wheel support on the front end of the supplemental beam; of the rotary shaft, a supporting-frame therefor loosely mounted on the frame, means for swinging said frame to different vertical angles, devices for interlocking the swinging frame with the supplemental beam, a hoe-carrying cross-arm secured to the lower end of the rotary shaft and means for rotating said shaft actuated by the rotation of the wheels, as set forth.

6. In a cotton-chopping machine of the character described, in combination with the wheeled supporting-frame, including the rotary and fixedly-held axle members, the driving-gear on the rotary axle-section, and the supplemental beam loosely supported at the rear end on the fixedly-held axle-section, a caster-wheel support for the front end of said beam, and a ratchet-disk fixedly connected to the rear end of the beam; of the swinging frame loosely mounted on the fixed axle member adjacent the ratchet-disk, said frame having a lever-arm, and a pawl carried thereon to engage the ratchet-disk, a rotary shaft mounted in the swinging frame, the pinion on the upper end of said shaft that engages the drive-gear, an obtuse-angle-shaped cross member on the lower end of the rotary shaft and the hoes adjustably connected to the cross member, all being arranged substantially as shown and described.

7. In a cotton-chopper of the character described, in combination with the wheel-carrying or main frame and the draft-tongue; of a supplemental beam hung at its rear end on the main frame, a caster-wheel support on the front end of the supplemental beam, a stop-guide on the tongue to limit the drop of the supplemental beam, another frame H hung in the main frame, means for shifting the vertical position of the frame H with respect to the main frame, and for connecting the said other frame H with the supplemental beam whereby the up-and-down movement of the supplemental beam is transmitted to the said frame H, a rotary shaft journaled in the frame H, means actuated from one of the wheels for imparting motion to the shaft, the obtuse-angle-shaped cross-bar secured to the lower end of the shaft and hoes adjustably connected to the end of the angled-shaped cross-bar, all being arranged substantially as shown and described.

JACOB RUFUS McKEE.

Witnesses:
W. G. JETTON,
J. R. JONES.